US011082850B2

(12) United States Patent
Tipton et al.

(10) Patent No.: US 11,082,850 B2
(45) Date of Patent: Aug. 3, 2021

(54) BLOCKCHAIN BASED WIRELESS ACCESS POINT PASSWORD MANAGEMENT

(71) Applicant: AT&T Intellectual Property I, L.P., Atlanta, GA (US)

(72) Inventors: Rick Tipton, Corryton, TN (US); Mark D. Austin, Allen, TX (US); Matt Dugan, Plano, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 446 days.

(21) Appl. No.: 16/019,376

(22) Filed: Jun. 26, 2018

(65) Prior Publication Data
US 2019/0394648 A1     Dec. 26, 2019

(51) Int. Cl.
| G06F 7/04 | (2006.01) |
| G06F 15/16 | (2006.01) |
| G06F 17/00 | (2019.01) |
| H04L 29/06 | (2006.01) |
| H04W 12/08 | (2021.01) |
| H04W 84/04 | (2009.01) |
| H04W 88/08 | (2009.01) |

(52) U.S. Cl.
CPC .......... *H04W 12/08* (2013.01); *H04L 63/083* (2013.01); *H04W 84/042* (2013.01); *H04W 88/08* (2013.01)

(58) Field of Classification Search
CPC ... H04W 12/08; H04W 84/042; H04W 88/08; H04W 12/00502; H04W 12/04033; H04W 12/00516; H04W 12/0609; H04W 12/003; H04L 63/083
See application file for complete search history.

(56) References Cited

U.S. PATENT DOCUMENTS

| 8,751,648 B2 | 6/2014 | Scherzer et al. |
| 9,014,634 B2 | 4/2015 | Deluca et al. |
| 9,215,005 B2 | 12/2015 | Friedl et al. |
| 9,344,883 B2 | 5/2016 | Perry et al. |
| 9,596,232 B2 | 3/2017 | An |
| 9,763,086 B2 | 9/2017 | Benoit et al. |

(Continued)

FOREIGN PATENT DOCUMENTS

GB     2486798 A     6/2012

OTHER PUBLICATIONS

"Decentralized Free Wi-fi Network Powered by Blockchain", Available online at: https://en.worldwifi.io/, Accessed on Jun. 5, 2018, 28 pages.

(Continued)

*Primary Examiner* — Kendall Dolly
*Assistant Examiner* — Kevin Ayala
(74) *Attorney, Agent, or Firm* — Amin, Turocy & Watson, LLP

(57) ABSTRACT

Techniques are disclosed herein for managing and sharing credentials, such as passwords for wireless access points using blockchain technology. In certain embodiments, a transaction may be generated using information and a set of conditions. A requester user device seeking access to a wireless access point may request the password from the blockchain fabric using a unique identifier for the wireless access point and may satisfy other conditions from the set of conditions which determines access to the password by the requester.

20 Claims, 9 Drawing Sheets

(56) References Cited

U.S. PATENT DOCUMENTS

| | | | |
|---|---|---|---|
| 2013/0006708 A1* | 1/2013 | Lee | G06Q 30/0201 705/7.29 |
| 2015/0099469 A1 | 4/2015 | Goldstein | |
| 2015/0124791 A1 | 5/2015 | Mazandarany et al. | |
| 2015/0227923 A1* | 8/2015 | Kutsch | G06Q 20/401 705/67 |
| 2016/0352723 A1 | 12/2016 | Li et al. | |
| 2017/0078880 A1 | 3/2017 | Likar et al. | |
| 2017/0111335 A1* | 4/2017 | Hibbert | H04L 63/0876 |
| 2017/0243213 A1* | 8/2017 | Castinado | G06Q 20/352 |
| 2017/0359343 A1* | 12/2017 | Sterl | H04L 67/125 |
| 2018/0035290 A1 | 2/2018 | Dowlatkhah et al. | |
| 2019/0268420 A1* | 8/2019 | Acharya | H04L 45/74 |
| 2019/0372834 A1* | 12/2019 | Patil | H04L 41/0806 |
| 2020/0265518 A1* | 8/2020 | Spangenberg | G06Q 20/3674 |

OTHER PUBLICATIONS

Dittmar, "Application of the Blockchain for Authentication and Verification of Identity", Available online at: http://www.cs.tufts.edu/comp/116/archive/fall2016/bcresitellodittmar.pdf, Nov. 30, 2016, 9 pages.

World WiFi ICO—Free WiFi Powered by the Blockchain, Available online at: https://webcache.googleusercontent.com/search?q=cache:aYWFAn9O-j0J:https://medium.com/%40info_19130/world-wifi-ico-free-wifi-powered-by-the-blockchain-fc63beee5ab1+&cd=2&hl=en&ct=clnk&gl=us, Accessed on Jun. 15, 2018, 5 pages.

\* cited by examiner

BLOCKCHAIN BASED WIRELESS ACCESS POINT PASSWORD MANAGEMENT

TECHNICAL FIELD

The present disclosure generally relates to managing passwords. In particular, the present disclosure relates to using blockchain technology for managing, controlling and sharing the passwords with a person or group of people.

BACKGROUND

A wireless access point (WAP) is a networking hardware device that allows a wireless (e.g., Wi-Fi) device to connect to a wired network. The WAP usually connects to a router (via a wired network) as a standalone device, but it can also be an integral component of the router itself. Wireless access has special security considerations. Many wired networks base the security on physical access control, trusting all the users on the local network, but if WAPs are connected to the network, anybody within range of the WAP (which typically extends farther than the intended area) can attach to the network. The most common solution is wireless traffic encryption using built-in encryption in the WAP and a password. Generally, the possessor of the password, such as a wireless device, can gain access to the wired network by using the password to the wired network through the WAP.

BRIEF SUMMARY

Techniques are disclosed herein for employing blockchain technology for managing, controlling and sharing credentials and passwords. Currently, when the owner/administrator of a wireless access point (WAP) wants to provide access to other users they must physically transfer a password to the requester of access, and this password is manually inserted into the user's device to gain access to the WAP. This is cumbersome and requires physical contact between the requester of access to the WAP and the owner/administrator of the WAP. In certain instances, the owner/administrator may send the password directly to the user via email or text message on a mobile device. However, such means are very insecure and leave the password in the clear and available for potential misuse. Example of WAP may include a Wi-Fi access point.

In certain embodiments, blockchain technology may be used for secure verification, sharing, and tracking for requests for passwords for a WAP. In such an implementation, there is no need for a central server for maintaining password information and verifying credentials of requesters of access to the WAPs. The distributed blockchain ledger provides for a mechanism for storing/logging of passwords and execution of smart contracts in the blockchain nodes for verification of identities and WAPs. The transactions stored may include the requests and responses for passwords and an immutable record of transaction.

An example apparatus may include memory configured to store a transaction received from a computing system, wherein the transaction comprises information associated with a unique identifier for a wireless access point, a password to access the wireless access point and a set of conditions to access the password for the wireless access point. The transaction is stored as part of at least a portion of a blockchain for managing passwords for wireless access points, wherein the blockchain comprises a plurality of blocks, each block of the plurality of blocks comprises a plurality of transactions.

In certain embodiments, the unique identifier for the wireless access point and the password for the wireless access point are provided by equipment of an owner of the wireless access point to a WAP management entity that encrypts and then deletes the password and stores the encrypted password in the transaction along with the unique identifier.

The set of conditions may include checking the cellular telephone network number associated with the device. However, the set of conditions may also include membership to a group, such as a social media group, location or payment for accessing the wireless access point. In certain embodiments, the password for the access to the wireless access point expires after a pre-determined period of time that is based on the payment.

In certain embodiments, a network interface is configured to receive a request for the password for the wireless access point, the request comprising the unique identifier for the wireless access point and a cellular telephone network number associated with a device for a sender of the request.

In certain embodiments, a processor is configured to execute instructions stored in the memory that, when executed by the processor, cause the processor to determine whether the request satisfies the set of conditions to access the password for the wireless access point from the transaction, wherein the set of conditions includes checking the cellular telephone network number associated with the device. In response to determining that the request satisfies the set of conditions to access the password for the wireless access point, in some embodiments, the processor may encrypt the password to generate an encrypted password and send the encrypted password to the device associated with the sender of the request. In certain embodiments, the set of conditions is checked using a smart contract implemented in Ethereum. In certain embodiments, the password expires after a pre-determined period of time. In some embodiments, the request from the sender and the response to the sender of the request are stored in a transaction on the blockchain.

In certain embodiments, the above disclosure with respect to the apparatus may be performed by a method and/or by a processor using instructions and data stored on a non-transient computer-readable memory and a network interface for sending and receiving transactions. In addition, certain portions, features or limitations of the above disclosure with respect to the method may be performed as a means for performing such portions, features or limitations or may be stored as executable code on a non-transitory computer-readable medium.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
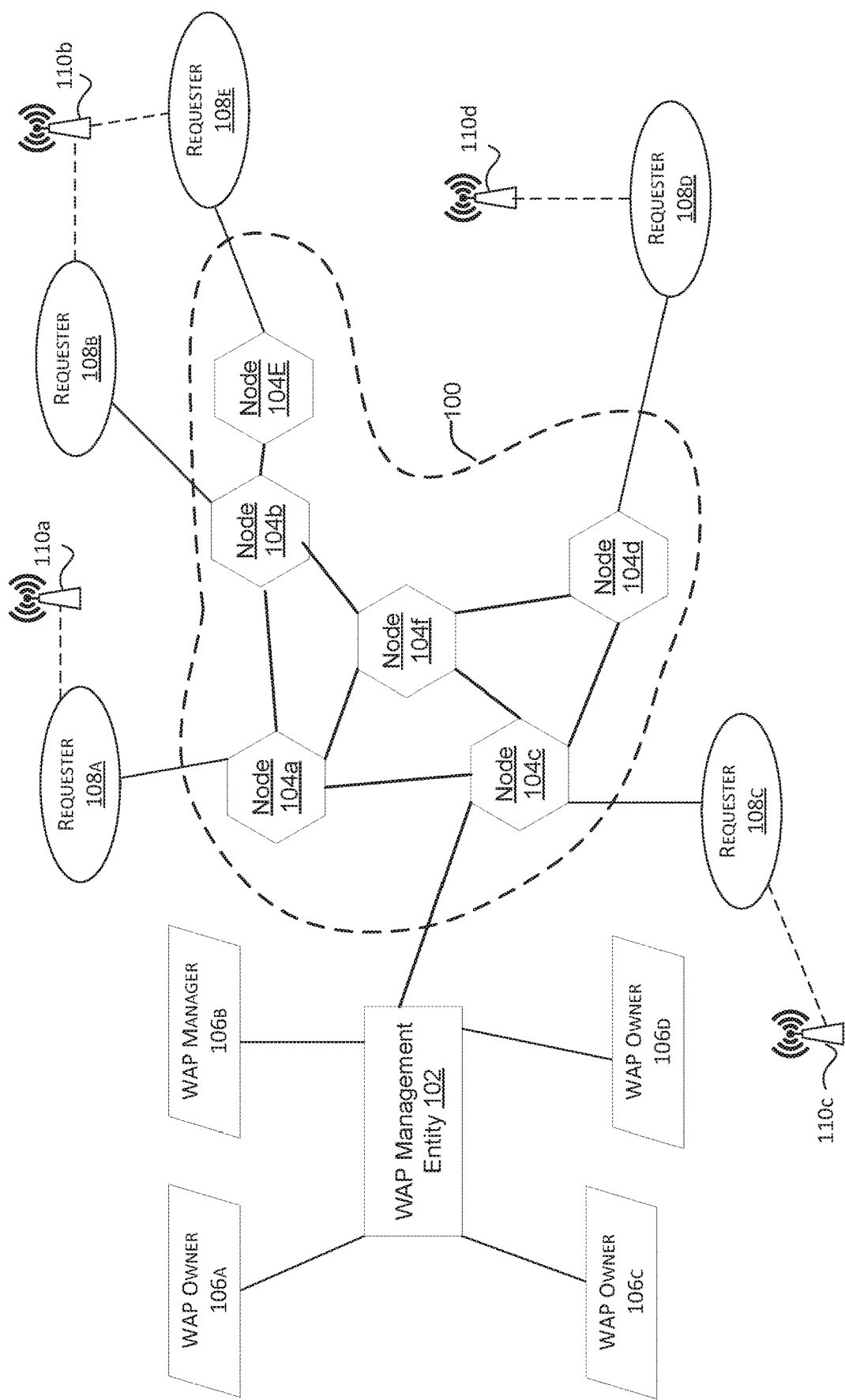
FIG. 1 illustrates an example system for managing passwords for wireless access points, according to certain embodiments of the disclosure.

The present disclosure generally relates to managing passwords. In particular, the present disclosure relates to using blockchain technology for managing, controlling and sharing passwords a person or group of people.

A wireless access point (WAP) is a networking hardware device that allows a wireless (e.g., Wi-Fi) device to connect to a wired network. The WAP usually connects to a router (via a wired network) as a standalone device, but it can also be an integral component of the router itself. Wireless access has special security considerations. Many wired networks base the security on physical access control, trusting all the users on the local network, but if WAPs are connected to the network, anybody within range of the AP (which typically extends farther than the intended area) can attach to the network. The most common solution is wireless traffic encryption using built-in encryption in the WAP and a password. Generally, the possessor of the password, such as a wireless device, can gain access to the wired network by using the password to the wired network through the WAP.

Currently, when the owner/administrator of a WAP wants to provide access to other users, he or she must physically transfer a password to the requester of access, and this password is manually inserted into the user's device to gain access to the WAP. This is cumbersome and requires physical contact between the requester of access to the WAP and the owner/administrator of the WAP. In certain instances, the owner/administrator may send the password directly to the user via email or text message on a mobile device. However, such means are very insecure and leave the password in the clear and available for potential misuse. Examples of a WAP may include a Wi-Fi access point.

In certain embodiments, blockchain technology may be used for secure verification, sharing, and tracking for requests for passwords for a WAP. In such an implementation, there is no need for a central server for maintaining password information and verifying credentials of requesters of access to the WAPs. The distributed blockchain ledger provides for a mechanism for storing/logging of passwords and execution of smart contracts in the blockchain nodes for verification of identities and WAPs. The transactions stored may include the requests and responses for passwords and an immutable record of transaction.

As described in more detail below, embodiments allow sharing of credentials and passwords for WAPs between parties that may or may not know each other. Embodiments may use blockchain for security, verification, logging and tracking. This will allow automation of transferring credentials and passwords from the owner/administrator of the WAP to the requester of access to the WAP so that the requester can connect to the internet. The access by the requester to the password for using the WAP may be preconditioned (using blockchain "smart contracts") on the identity of the requester, a list of requesters, or several other criteria. Such a distributed system using blockchain for managing passwords can seamlessly and securely provide the requester access by verifying both the WAP and the user. Besides providing good security and trust between the parties, using blockchain also provides an immutable record of all transactions and records. The distributed nature of the blockchain would also provide greater reliability and avoid points of failure in the system and avoids the need of maintaining a central server for potentially managing access via passwords, while providing mechanisms for user/owner anonymity. Other fine grain controls may be implemented, such as expiration of passwords, etc.

FIG. 1 illustrates an example system for managing passwords for WAPs. The system includes a blockchain fabric 100 for managing the passwords. As shown in FIG. 1, the blockchain fabric 100 includes computing nodes (104a, 104b, 104c, 104d, 104e and 104f). In certain embodiments, several devices connect to the blockchain fabric 100 by connecting to one of the various nodes (104a-104f) of the blockchain fabric 100. Ethereum is an example blockchain technology that may be used to implement the blockchain fabric 100 over its associated nodes—104a-104f.

FIG. 1 also depicts several wireless access point (WAP) owner devices (106a, 106c, and 106d) and a wireless access point (WAP) manager device 106b that are coupled to a WAP management entity 102 which is in turn coupled to node 104c of the blockchain fabric 100. The WAP owner or manager devices are devices that control their respective WAPs. For example, the user of WAP owner device 106a may own WAP 110a and control the operations of WAP 110a. For example, the owner of WAP 110a may change the configurations (password, filters, rules, etc.) of WAP 110a by remotely logging into WAP 110a through the WAP owner device 106a. The WAP manager device 106b is similar to a WAP owner device 106a, except that the user of the WAP manager device 106b may be assigned to merely manage the WAP 110a and may not own the WAP 110a. The WAP owner/manager devices may send the unique identifiers for the WAPs (110a-110d), the passwords and certain conditions to the WAP management entity 102. In certain embodiments, as described in more detail in FIG. 2, the WAP owners/managers devices (106a-106d) may execute an application that enables gathering of conditions, a unique identifier and the password and sends this information to the WAP management entity 102. The unique identifiers may include the media access control (MAC) address or service set identifier (SSID) for the WAPs.

The WAP owner/manager devices (106a-106d), besides managing their respective WAPs, are also in communication with the WAP management entity 102. The WAP management entity 102 may be a central server that connects and updates the blockchain fabric 100 via node 104c and is responsible for receiving the unique identifiers, passwords and conditions for accessing the WAPs (110a-110d) and generating transactions to be stored in the blockchain fabric 100. An example embodiment of the WAP management entity 102 is disclosed in FIG. 3. Although, a central server is shown as performing the functionality of a WAP management entity 102, in certain embodiments, this functionality may be distributed between multiple devices or may even be performed by the application executing on the owner/manager (106a-106d) devices described previously.

The WAP management entity 102 generates a transaction or "smart transaction" by including information about the conditions received from the WAP owner/manager device 106a-106d in the transaction along with the password and unique identifier for the respective WAP. The password may be encrypted by the WAP management entity 102 prior to including the password in the transaction. In addition, the WAP management entity 102 may autonomously generate executable code using the conditions 144. This executable code is executable by any of the nodes and is included in the transaction. This executable code included in the transaction represents a certain condition that, once fulfilled by the requester of the password/access to the WAP, releases the password to the requester. In one embodiment, releasing the password to the requester may include decrypting the password and re-encrypting the password with the requester's provided public key, so that the requester can use its own private key to read the password back. The WAP management entity 102 may also digitally sign the transaction using its private key and store the digital signature as part of the transaction prior to sending the transaction to the blockchain fabric 100 for storing.

Figure 5:
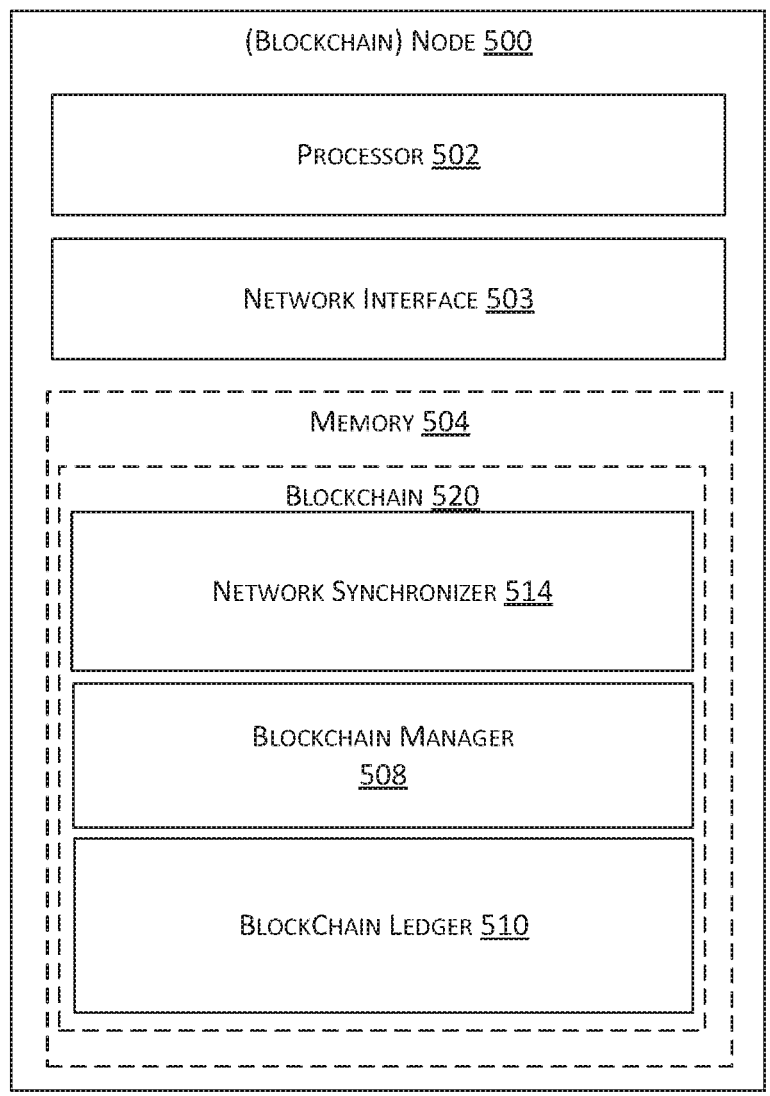
FIG. 5 illustrates an example blockchain node, according to certain aspects of the disclosure.
Figure 9:
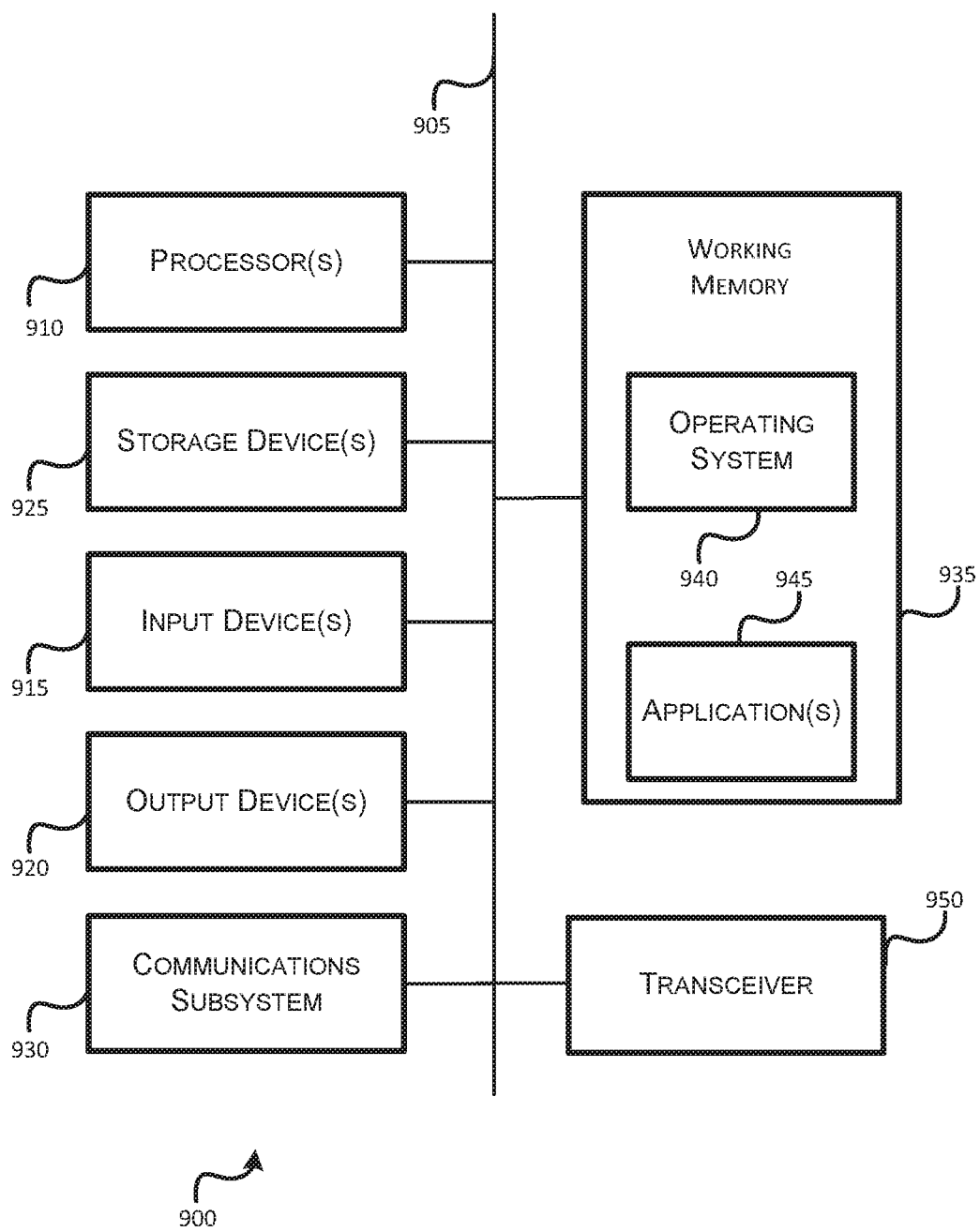
FIG. 9 is an example computer system, according to certain embodiments of the disclosure.

The WAP management entity 102 interacts with the blockchain fabric 100 via a blockchain node 104c. FIG. 1 discloses a blockchain fabric 100 comprising a net of (computing) blockchain nodes 104a-f. FIG. 5 and FIG. 9 disclose example implementations of a node of the blockchain fabric 100. Each node may execute instructions from their respective memory and/or local storage to maintain the blockchain ledger in memory or local storage, interact with other nodes over the network, grant access to the WAP management entity 102 for writing transactions and grant access to the information inside the transactions to the requesters of the passwords (i.e. access to the WAPs).

In one embodiment, blockchain uses a blockchain ledger that refers to a continuously growing list of records, called blocks, which are linked and secured using cryptography. Each block of the blockchain ledger typically contains a cryptographic hash of the previous block, a timestamp and several transactions. By design, a blockchain ledger is inherently resistant to modification of data that is stored in the blocks. In certain embodiments, for use as a distributed ledger to store sensitive information, the blockchain ledger is managed by a peer-to-peer network (referred to as the blockchain fabric 100), comprising blockchain nodes 104a-f, collectively adhering to a protocol for inter-node communication and validating new blocks of transactions. Once recorded, the data in any given block cannot be altered retroactively without the alteration of all subsequent blocks, which requires collusion of the network majority.

In certain embodiments, every node in the blockchain fabric 100 has synchronized access to the entire blockchain ledger maintained by blockchain fabric 100 with the guarantee that any other node in the blockchain fabric has exactly the same copy or access to the same copy of the entire blockchain ledger. Furthermore, any node in the blockchain fabric 100 can verify the authenticity and integrity of the blockchain ledger by performing cryptographic operations on the hashes embedded in the blocks of the blockchain ledger. Therefore, the blockchain fabric 100 provides distributed access to the requesters to the user information stored as part of the blockchain ledger in a secure, distributed and immutable manner. Furthermore, different requesters can have access to one or more nodes of the blockchain fabric 100 that provide access to user information from the local copy of the blockchain ledger in the blockchain fabric 100, knowing that an update to any of the local copies of the blockchain ledger stored at any of the respective blockchain nodes will get validated and propagated throughout the blockchain fabric 100.

In FIG. 1, the requesters may be connected to any blockchain node of the blockchain fabric 100 and access the same information from their respective blockchain ledger. For example, the WAP management entity 102 is coupled to blockchain node 104c for storing the transactions, whereas requester 108b is coupled to node 104b and requester 108e is coupled to node 104e. In this system, the requester 108b and requester 108e will have access to the same transaction with the password for WAP 110b stored by the WAP management entity 102 in the blockchain fabric 100 via the blockchain node 104c.

In certain embodiments, an example blockchain technology optimized for executing "smart contracts," such as Ethereum, may be used. Ethereum is an open-source, public, blockchain-based distributed computing platform and operating system featuring smart contract functionality. Ethereum transactions can be programmed using a blockchain programing model or paradigm named "Solidity." Ethereum provides a decentralized Turing-complete virtual machine, the Ethereum Virtual Machine (EVM), which can execute the smart contracts.

FIG. 1 also depicts the requesters (108a, 108b, 108c 108d and 108e) of access to the WAPs (110a-110d) that are also connected to the blockchain fabric 100. Requesters 108a-108e are user devices requesting access to the intranet/internet via a WAP in their connectivity range. Such an example user device is described in more detail in FIG. 4. Requester 108a is coupled to the blockchain fabric 100 via node 104a and requests access (i.e., password to connect) to WAP 110a from blockchain fabric 100. Requester 108b and requester 108e are coupled to the blockchain fabric 100 via node 104b and node 104e, respectively, and request access (i.e., password to connect) to WAP 110b from blockchain fabric 100. Requester 108c is coupled to the blockchain fabric 100 via node 104c and requests access (i.e., password to connect) to WAP 110c from blockchain fabric 100. Requester 108d is coupled to the blockchain fabric 100 via node 104d and requests access (i.e., password to connect) to WAP 110d from blockchain fabric 100.

Once again, tying all the various devices together, in one embodiment of FIG. 1, the WAP owners/managers (106a-106d) own and/or manage their own WAPs (110a-110d), respectively. The WAP owners/managers (106a-106d) possess the password and unique identifiers (e.g., SSID) for the WAPs (110a-110d). The WAP owners/managers (106a-106d) also generate conditions that the requester has to fulfill before being granted access the respective WAP. Each WAP owner/manager (106a-106d) sends the unique identifiers, password and conditions to access his or her respective WAPs to the WAP management entity 102. The WAP management entity 102 generates a transaction for each WAP using the unique identifiers for the WAPs, the passwords and the conditions to be satisfied by the requester for accessing the password. The WAP management entity 102 stores the transaction in the blockchain fabric 100 via blockchain ledger at node 104c. As previously discussed, storing at one node propagates the transaction throughout the nodes of the blockchain fabric 100. Now, any requester connected to one of the nodes of the blockchain fabric 100, after satisfying the conditions stored in the transaction, causes the transaction to release the password to the requester. Once one of the requesters has the password he or she can attempt to connect to the WAP in their respective vicinity.

Figure 2:
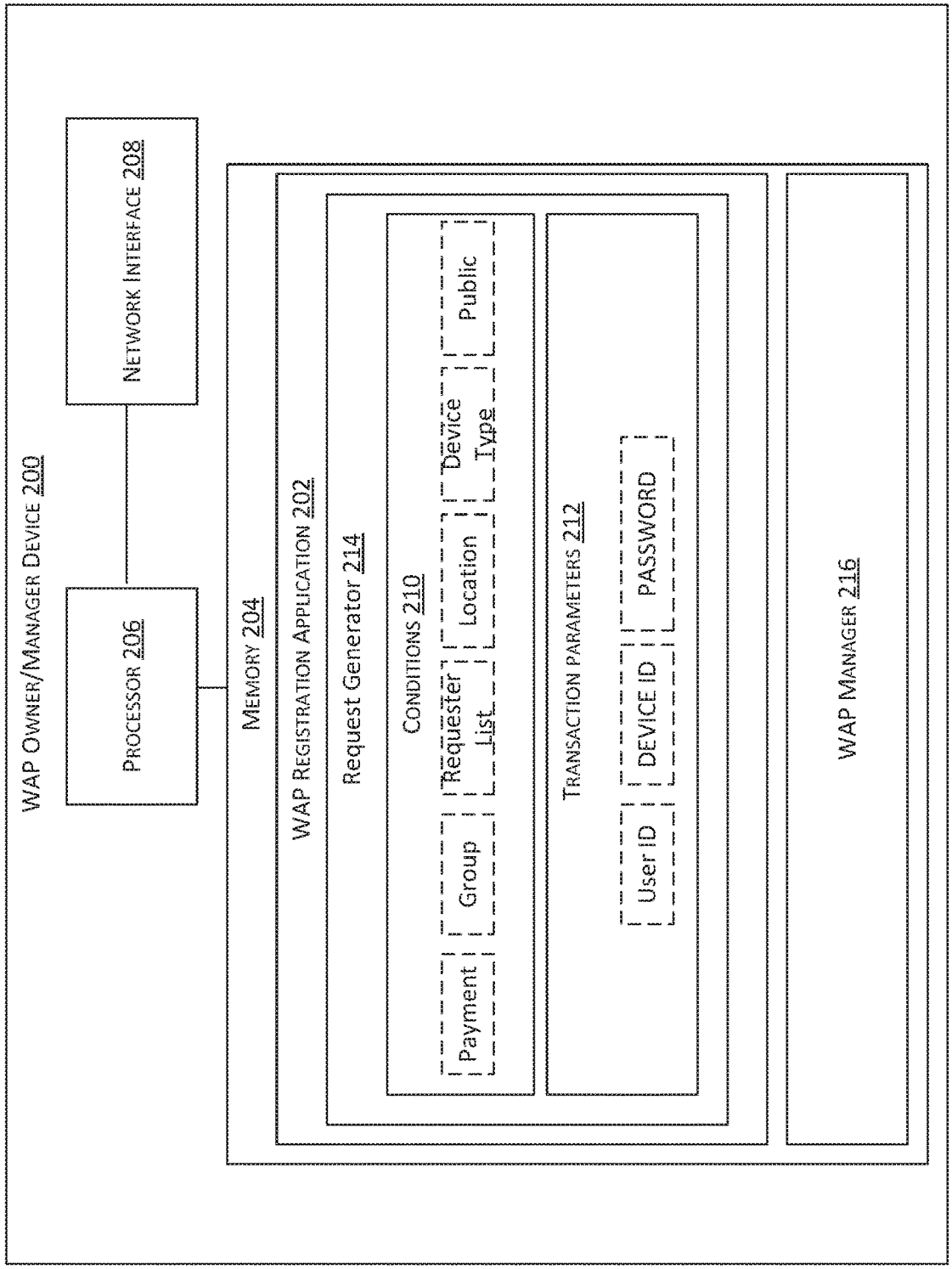
FIG. 2 illustrates an example WAP owner/manager device, according to certain aspects of the disclosure.

FIG. 2 illustrates an example WAP owner/manager device, according certain aspects of the disclosure. The WAP owner/manager device 200 may represent a non-limiting example of the WAP owner/manager devices 106a-106d of FIG. 1. Besides the components disclosed in FIG. 2, the WAP owner/manager device 200 may include one or more components disclosed in FIG. 9. In general, the WAP owner/manager device 200 may include a processor 206, a network interface 208 and memory 204. In certain embodiments, the memory 204 may be a non-transient computer-readable medium and/or may be similar to memory 935 of FIG. 9. The memory 204 may include various modules implemented as instructions that are loaded from the memory 204 into the processor 206 to perform certain functions. The instructions in memory 204 may be stored on a storage device locally or a network storage device and accessed via the network interface 208.

In certain embodiments, the memory 204 may include a WAP manager 216 for managing configurations of a WAP and a WAP registration application 202 for registering the WAP with the blockchain fabric 100 via the WAP management entity 102. The WAP manager 216 controls/manages operations of a WAP. For example, a user of WAP owner/manager device 200 may change the configurations (password, filters, rules, etc.) of a WAP by remotely logging into WAP 110a through a WAP manager 216 portal or application on the WAP owner/manager device 200.

The WAP registration application 202 may include a request generator 214 for aggregating the transaction parameters 212 and conditions 210. The transaction parameters 212 may include the user ID (e.g., Cellular Telephone Network (CTN) number), device ID for the WAP and password for accessing the WAP. In certain embodiments, the user ID may be optional and the access may be based on the conditions 210 being satisfied. Examples of a device ID may include unique identifiers, such as MAC address and/or SSID. In certain embodiments, the WAP registration application 202 may receive the device ID and the password for the WAP from the WAP manager 216. In certain embodiments, the password may be encrypted prior to sending to the WAP management entity 102. The conditions 210 may be specified by an authorized user of the WAP owner/manager device 200. Conditions 210 may be conditions to be included in the transaction by the WAP management entity 102, such that the password of a WAP is revealed by the blockchain fabric 100 to a requester of access to the WAP only upon the requester satisfying the conditions specified by the WAP owner/manager device 200.

The conditions 210, may include, but are not limited to, payment, group, requester list that includes the user IDs or CTNs, location, device type, public, time of day for use of the WAP, amount of use by the user, etc. For example, a requester may be granted access to a WAP upon making a certain amount of payment to the owner of the WAP. Such a payment term may be included in the smart contract of the transaction, specified by the request generator 214. In another embodiment, a requester belonging to a certain group may be automatically given access to the password to access the WAP. Group membership may include the requester belonging to a certain online social group, emergency services group, maintenance group, etc. Proof of group membership may be included by the requester of access to the blockchain fabric 100 using digital certificates. In certain embodiments, the WAP owner/manager device 200 may have an explicit requester list of requesters that are pre-authorized (or blacklisted) to access the WAP and provide the password to the WAP. For example, the contract may include checking for a CTN number associated with a user and if the CTN number is from a particular user or belongs to a particular area code, the requester may be provided with a password and granted access. Conditions 210 may also include the location from which the requester may access the WAP and the device type that may be allowed to communicate with the WAP. In some instances, the conditions 210 may prescribe that access to the WAP within a particular area within a particular time is free of charge or nominally charged by the owner of the WAP.

Figure 3:
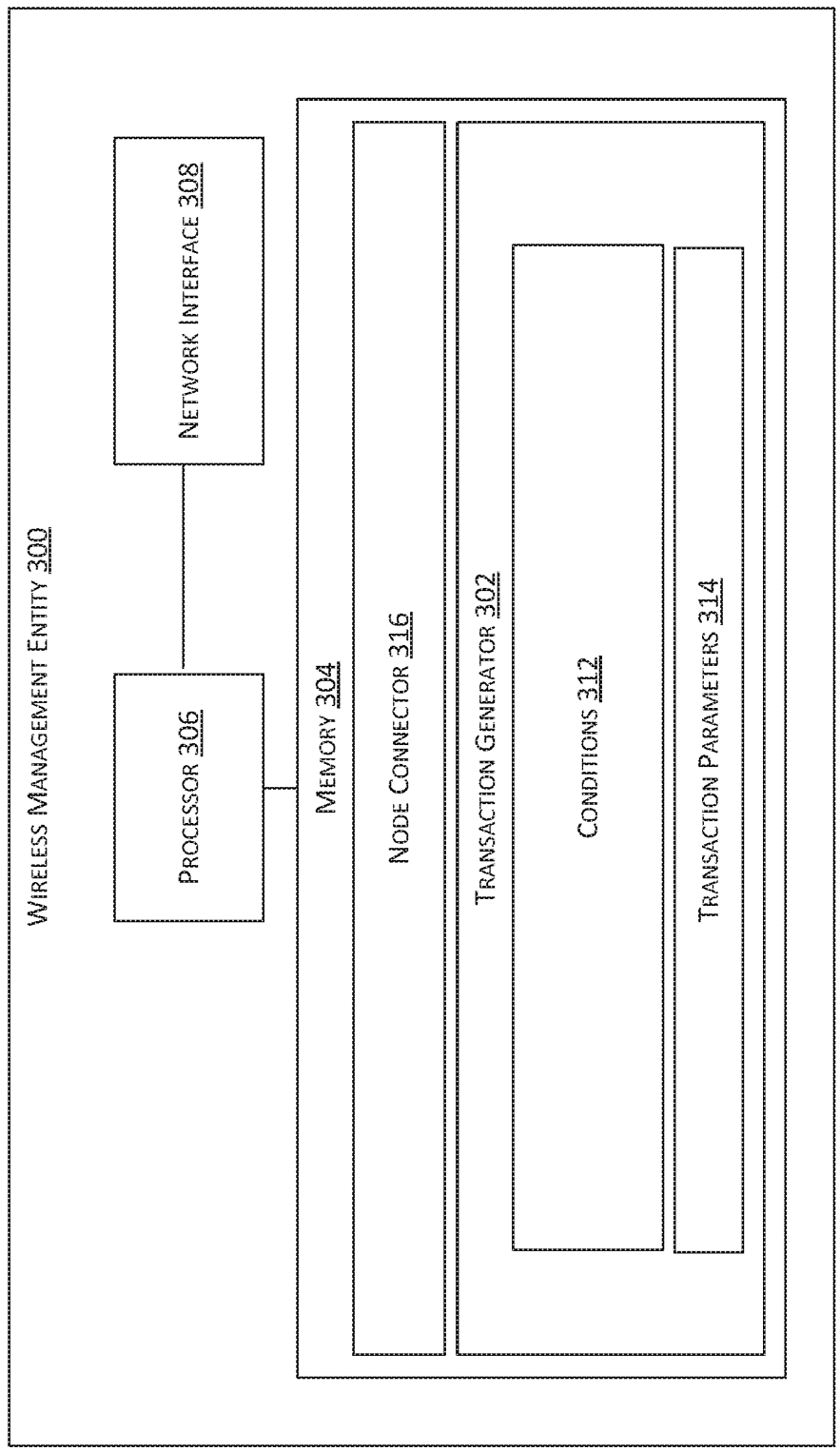
FIG. 3 illustrates an example WAP management entity, according to certain aspects of the disclosure.

FIG. 3 illustrates an example WAP management entity, according certain aspects of the disclosure. The WAP management entity 300 may represent a non-limiting example of the WAP management entity 102 of FIG. 1. Besides the components disclosed in FIG. 3, the WAP management entity 300 may include one or more components disclosed in FIG. 9. In general, the WAP management entity 300 may include a processor 306, a network interface 308 and memory 304. In certain embodiments, the memory 304 may be a non-transient computer-readable medium and/or may be similar to memory 935 of FIG. 9. The memory 304 may include various modules implemented as instructions that are loaded from the memory 304 into the processor 306 to perform certain functions. The instructions in memory 304 may be stored on a storage device locally or a network storage device and accessed via the network interface 308.

In certain embodiments, the memory 304 may include a node connector 316 for connecting with a node of the blockchain fabric 100 using the network interface 308. The memory 304 may also include a transaction generator 302 for generating transactions to be stored on the blockchain fabric 100. The transaction generator 302 generates a transaction or "smart transaction" by including information about the conditions 312 received from the WAP owner/manager device 200 in the transaction along with the password and unique identifier from the transaction parameters 314 for the respective WAP. The password may be encrypted by the transaction generator 302 prior to including the password in the transaction. In one embodiment, the WAP management entity deletes the password once the password is encrypted.

In addition, the transaction generator 302 may autonomously generate executable code using the conditions 312.

This executable code is executable by any of the nodes and is included in the transaction. This executable code included in the transaction represents certain conditions 312 that, once fulfilled by the requester of the password/access to the WAP, release the password to the requester. The conditions 312 are similar to the conditions 210 and are received from the WAP owner/manager device 200 of FIG. 2. In one embodiment, releasing the password to the requester may include decrypting the password and re-encrypting the password with the requester's provided public key, so that the requester can use its own private key to read the password. The transaction generator 302 may also digitally sign the transaction using its private key and store the digital signature as part of the transaction prior to sending the transaction to the blockchain fabric 100 for storing.

Figure 4:
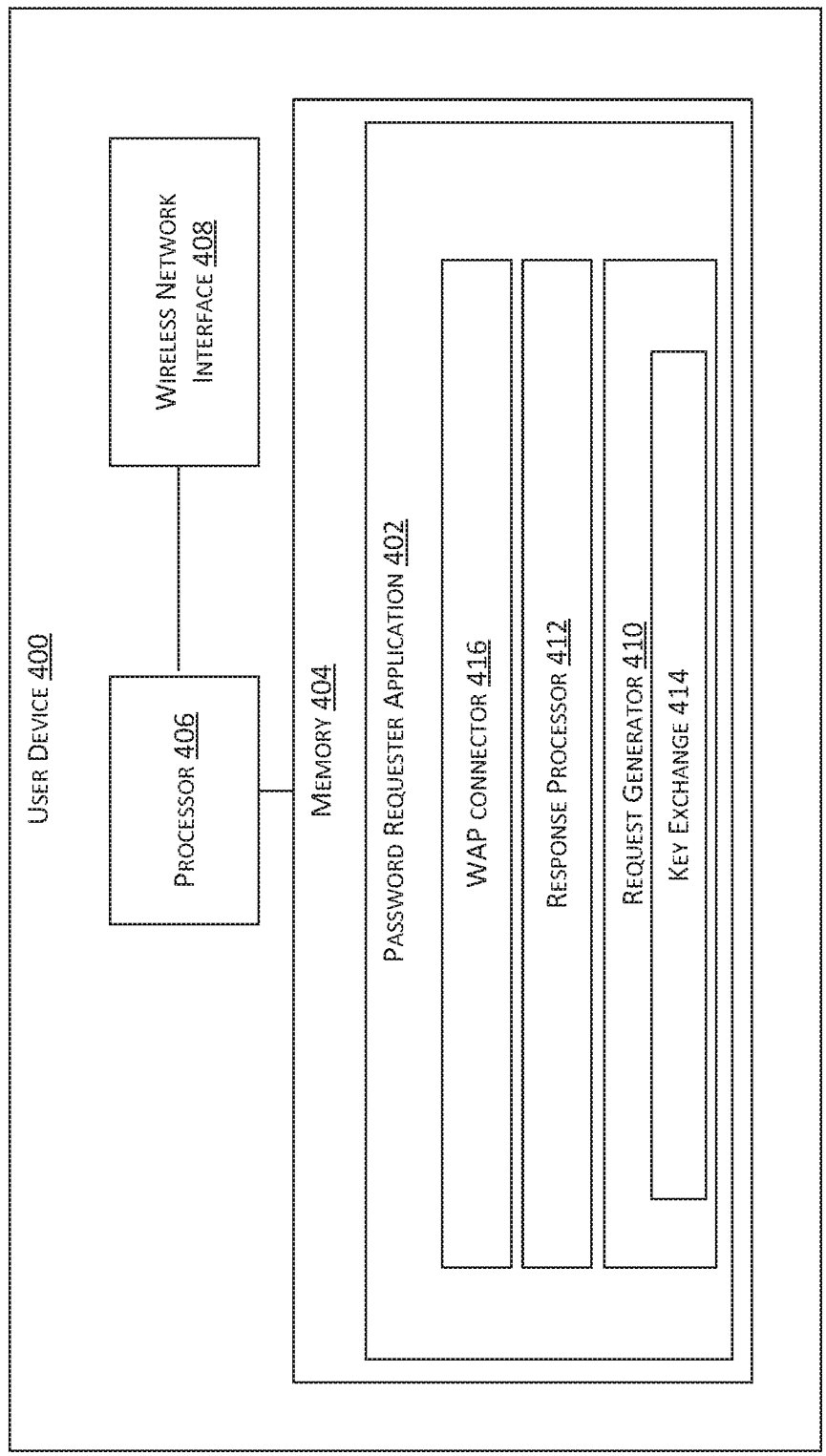
FIG. 4 illustrates an example requester user device, according to certain aspects of the disclosure.

FIG. 4 illustrates an example requester user device, according certain aspects of the disclosure. The requester user device 400 may represent a non-limiting example of the requesters 108a-108d of FIG. 1. Besides the components disclosed in FIG. 4, the requester user device 400 may include one or more components disclosed in FIG. 9. In general, the requester user device 400 may include a processor 406, a wireless network interface 408 and memory 404. In certain embodiments, the memory 404 may be a non-transient computer-readable medium and/or may be similar to memory 935 of FIG. 9. The memory 404 may include various modules implemented as instructions that are loaded from the memory 404 into the processor 406 to perform certain functions. The instructions in memory 404 may be stored on a storage device locally or a network storage device and accessed via the network interface 408.

In certain embodiments, the memory 404 may include a password requester application 402. The password requester application 402 may be responsible for communicating with the WAP detected in the vicinity of the user device 400, retrieving an identifier (e.g., SSID) from the detected WAP and communicating with the blockchain fabric 100 for requesting the password for the detected WAP, so that the user device 400 may connect to the detected WAP. The password requester application 402 may also include WAP connector 416 that, via the wireless network interface 408, may retrieve the SSIDs for the various detected WAPs. The user may select one of the WAPs or the user device 400 may automatically select one of the WAPs based on one or more criteria, such as signal strength, connection policies, etc. The WAP connector 416 may provide the WAP unique identifier (e.g., SSID) to the request generator 410 for generating a request for a password for the WAP from the blockchain fabric 100. The request generator 410 may connect with a node of the blockchain fabric 100 using either a wired or wireless connection. For example, a mobile device may use its wireless data service (e.g., Long Term Evolution (LTE) connection) to connect to a node prior to connecting to the intranet/intranet using the WAP. In certain embodiments, the requester may use its CTN number in establishing its connection and receiving a password. The CTN number may also be used as a user ID. In another embodiment, the WAP may allow for a temporary connection to a blockchain fabric 100 such that the user device 400 may retrieve an encrypted password for the WAP from the blockchain fabric 100. In one embodiment, the request generator 410 may perform a key exchange 414 with a node of the blockchain fabric 100 prior to requesting the password, so that the password can be securely transmitted between the blockchain node and the password requester application 402 of the user device 400. The request generator 410 may send a request to the node that includes at least a unique identifier (e.g., SSID, MAC) to the node, so that the node can search its blockchain ledger to locate the records/transactions in the blockchain ledger that include the password for the WAP that the unique identifier is associated with. In addition to the unique identifiers, the request generator 410 may include additional information to comply with the conditions of the transaction, such as the device type, firmware version on the device, user ID (CTN number), any particular social groups the user belongs to, location, etc. If the user device 400 satisfies all the conditions of the transaction for accessing the WAP, the user device 400 may receive a response from the node of the blockchain fabric 100. The response processor 412 may take the response, decrypt the password and provide the password to WAP connector 416, so that the WAP connector 416 can apply the password to the WAP and connect to the WAP for interne access.

Although WAP owner/manager device 200, WAP management entity 300 and requester user device 400 are shown as discrete devices using discrete applications, in certain embodiments one or two devices executing one or two applications may perform multiple functions providing multiple different modes or interfaces to the user. For example, in certain embodiments, a single application running on a mobile device may accomplish the functionality described with reference to WAP owner/manager device 200, WAP management entity 300 and requester user device 400.

FIG. 5 illustrates an example (computing) blockchain node 500 or simply node 500 of a blockchain fabric 100 that includes components of the blockchain 520, according to certain aspects of the disclosure. In certain embodiments, in addition to the components disclosed in FIG. 5, one or more components and/or functionality disclosed with respect to FIG. 9 may also be included in the node 500 of FIG. 5. For example, FIG. 9 discloses a transceiver 950 that may be used in a node. In certain embodiments, the node 500 may also include a transceiver 950 and may wirelessly (or using a wired connection) transmit and receive information instead or in addition to a network interface 503 disclosed in FIG. 5. The components and modules discussed in FIG. 5 may be implemented in hardware, software, firmware or any combination thereof.

Node 500 may include a processor 502 coupled to memory 504. In certain embodiments, the processor 502 may be similar to the processor 910 of FIG. 9. In certain embodiments, the memory 504 may be a non-transient computer-readable medium and/or may be similar to memory 935 of FIG. 9. The processor 502 may load instructions and data from a storage device (not shown) into memory 504 before executing the instructions from the memory 504. For implementing certain aspects of the disclosure, several different modules comprising instructions and data may be loaded into memory. Examples of such modules may include the blockchain ledger 510, blockchain manager 508, and network synchronizer 514.

Figure 6:
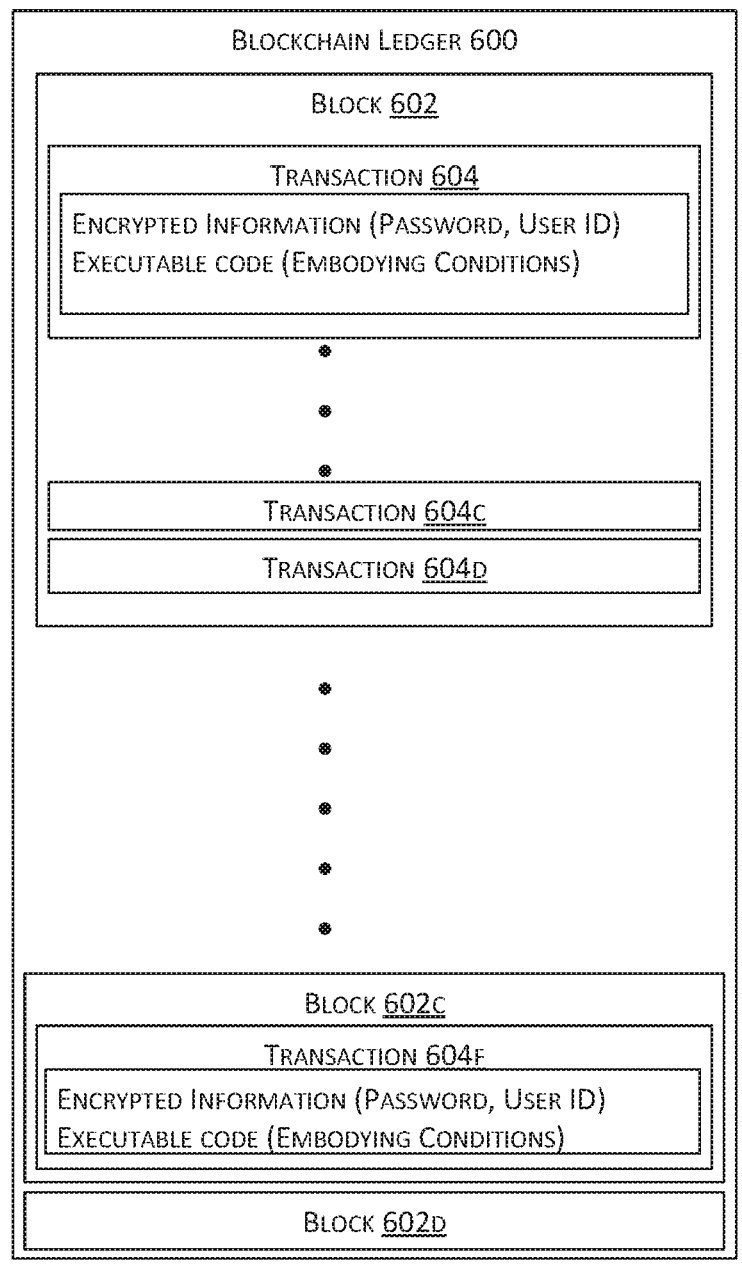
FIG. 6 is an example block diagram that illustrates some aspects of a blockchain ledger, according to certain example embodiments.

The blockchain ledger 510 may also be referred to simply as blockchain or a blockchain data structure. FIG. 6 is an example block diagram that illustrates some aspects of an example blockchain ledger 510, according to certain aspects of the disclosure. Momentarily referring to FIG. 6, the blockchain ledger 600 is a data structure that stores the information for different WAP devices as transactions and includes a continuously growing list of records, called blocks, which are linked and secured using cryptography. In FIG. 6, the blockchain ledger 600 includes the plurality of blocks—602, 602c, and 602d. Each block includes the plurality of transactions—transactions 604, 604c, 604d in block 602 and transaction 604f in block 602c.

Although not shown in FIG. 6, each block of the blockchain ledger 600 typically contains a cryptographic hash of the previous block, a timestamp and several transactions. A transaction is a signed data structure expressing a transfer of information. In certain embodiments described herein, transactions are generated by various managing entities, transmitted over the network and included into blocks, made permanent by the blockchain ledger 600.

By design, the blockchain ledger 600 is inherently resistant to modification of data that is stored in the blocks. Therefore, the order and content of the blocks (that include transactions in each block) are woven together and as new transactions arrive and consequently new blocks are added using cryptographic hashes (e.g., one way functions), the content of the blockchain ledger 600 becomes immutable. Changing data associated with old transactions is not feasible, since such a change would require regeneration of hashes for every subsequent transaction/block including the block in which the change is desired.

FIG. 6 also illustrates multiple transactions that include the encrypted information (e.g., password, user id) and instructions embodying conditions. The instructions may be generated from the set of conditions provided by the WAP owner/manager device 200 that, once satisfied, results in decrypting and releasing of the password. Although not shown, the transactions may have several other elements, such as identifiers (e.g., SSID), digital signatures and other states associated with performance of the instructions. In certain embodiments, the latest transaction associated with a user and assigned a specific identifier may be the only valid transaction. The previous transactions may still be available and may provide a permanent log of all the transactions associated with the user for that specific identifier.

The blockchain manager 508 manages the blockchain ledger 510. In certain embodiments, the blockchain manager 508 may be referred to as the blockchain core. The blockchain manager 508 is responsible for storing and retrieving transactions from the blockchain ledger 510. In addition, the blockchain manager 508 is responsible for generating hashes while storing transactions and blocks in the blockchain ledger 510 and also verification of new blocks received via the network interface 503 using cryptographic operations prior to adding such blocks/transactions to the blockchain ledger 510. The blockchain manager 508 also performs peer discovery and manages synchronization with other nodes in the blockchain fabric 100 using network synchronizer 514 via the network interface 503 of the node 500.

Figure 7:
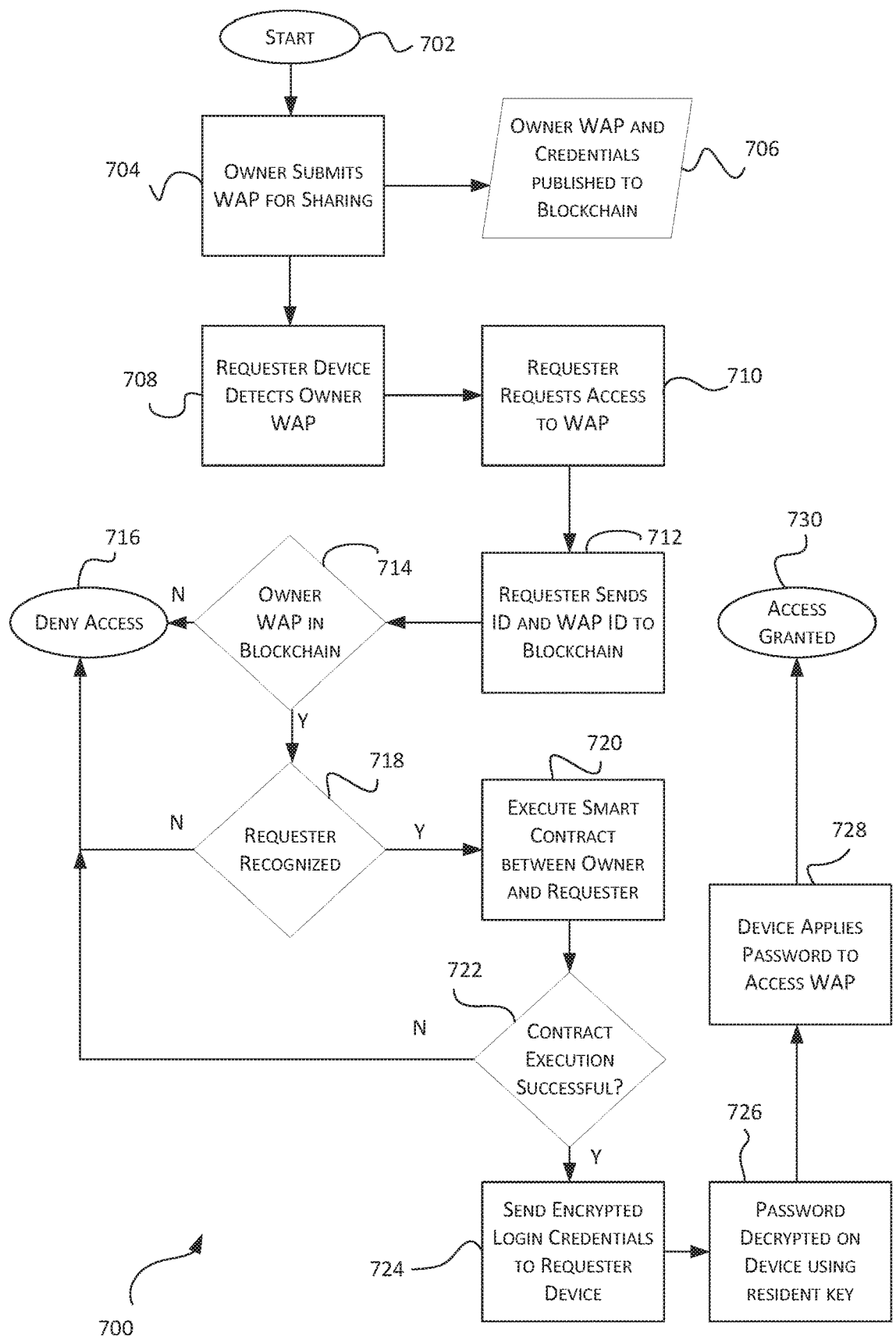
FIG. 7 is a simplified flow diagram, illustrating a process for sharing passwords with a device requesting access to a WAP using the blockchain fabric, according to certain embodiments of the disclosure.

FIG. 7 is a simplified flow diagram, illustrating a process for sharing passwords with a device requesting access to a WAP using the blockchain fabric, according to certain embodiments of the disclosure. Blockchain fabric 100 of FIG. 1 is an example of such a blockchain fabric. In certain embodiments, the WAP owner/manager device 200, WAP management entity 300, requester user device 400 and the node 500 collectively perform several steps of the described process 700. The process 700 is performed by processing logic that comprises hardware (circuitry, dedicated logic, etc.), software (such as is run on a general purpose computer system or a dedicated machine), firmware (embedded software), or any combination thereof. In one embodiment, the process 700 is performed by one or more computer systems 900 as described in FIG. 9. In certain embodiments, the computer system may also be referred to as a server or computing server.

The process of sharing a WAP by a first entity and requesting access to the WAP by a second entity using the blockchain fabric is started at block 702. At block 704, the owner submits a WAP for sharing. At block 706, the owner may submit the WAP for sharing by publishing the WAP unique identifier (e.g., SSID, MAC, etc.) and credentials (e.g., password) to the blockchain fabric, such as the blockchain fabric 100. In one embodiment, the owner uses the WAP owner/manager device 200 of FIG. 2 to submit a request to the WAP management entity 300 of FIG. 3 to generate a transaction and store the transaction in the blockchain fabric.

At block 708, a requester device, such as the requester user device 400, may detect the owner's WAP. In one embodiment, the requester device performs a Wi-Fi device scan and detects the owner's WAP.

At block 710, the requester device requests access to the WAP by sending a transaction query to a node of the blockchain fabric. An example node 500 is disclosed in FIG. 5. At block 712, the request may include the unique identifier for the WAP (e.g., SSID) and the user ID (e.g., CTN number).

At block 714, the node checks the blockchain ledger using the unique identifier for the WAP, to determine if the owner WAP is in the blockchain ledger. If the owner WAP is not found, access to the WAP is denied and the request fails to return a password (block 716). On the other hand, if owner WAP is found in blockchain, then at block 718, the requester is identified using the provided user ID. If the user ID does not match a user ID stored in the blockchain fabric for access to the requested WAP, then access is denied and the request fails to return a password (block 716). However, if the user ID does match a transaction stored for the WAP, then at block 720, the smart contract is executed between the owner and the requester. The smart contract may check for several conditions, such as social membership of user, location of user, device type of user, trustworthiness of the user, payment from the user, etc. At block 722, if the smart contract is unsuccessful, then access is denied and the request fails to return a password (block 716). However, if the contract execution is successful, at block 724, the node releases the login credentials (e.g., password) in encrypted form to the requester.

At block 726, the requester user device decrypts the password on the device. At block 728, the requester user device applies the password to access the WAP and is granted access (block 730).

It should be appreciated that the specific steps illustrated in FIG. 7 provide a particular process of switching between modes of operation, according to an embodiment of the present disclosure. Other sequences of steps may also be performed accordingly in alternative embodiments. For example, alternative embodiments of the present disclosure may perform the steps outlined above in a different order. To illustrate, a user may choose to change from the third mode of operation to the first mode of operation, the fourth mode to the second mode of operation, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 700.

Figure 8:
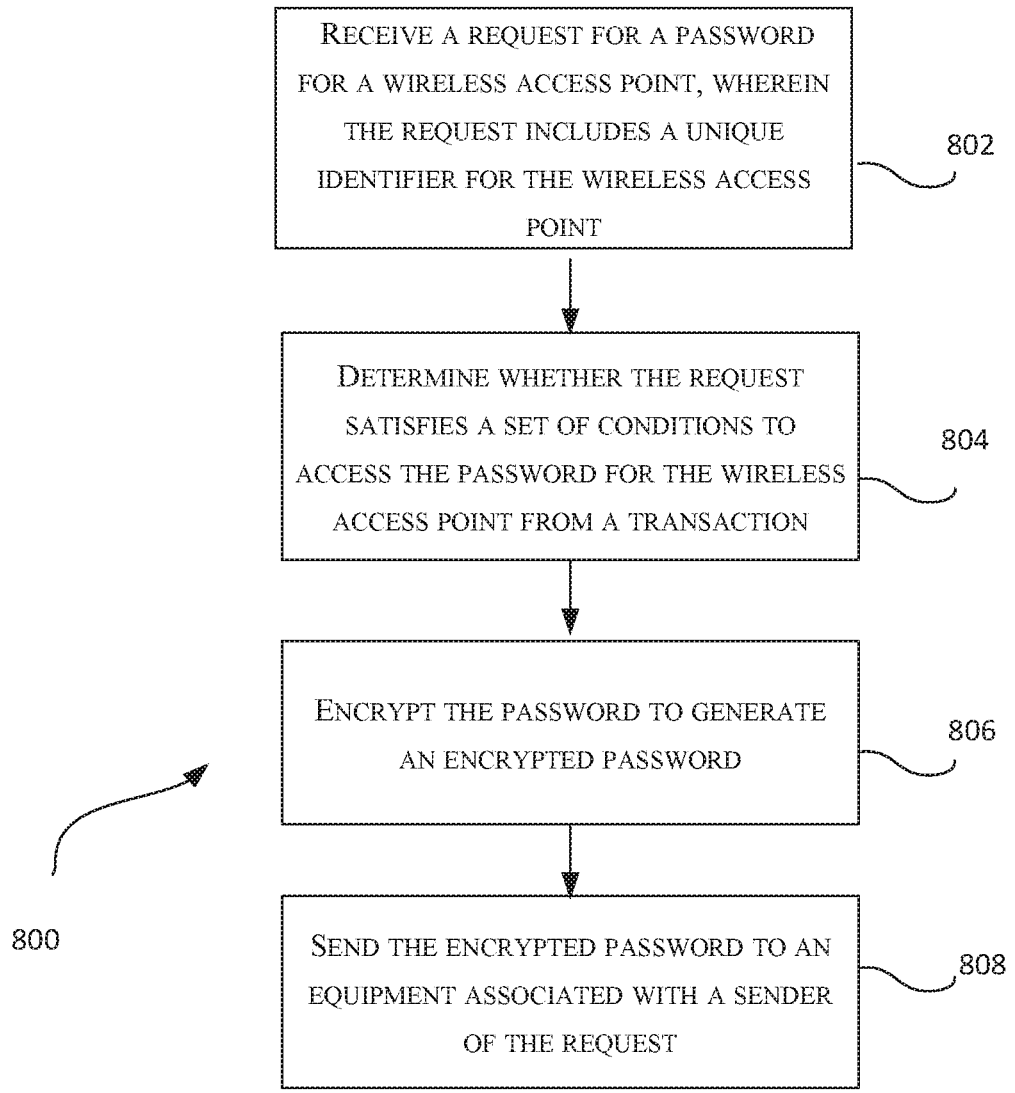
FIG. 8 is a simplified flow diagram, illustrating a process for generating a transaction and interacting with the blockchain fabric according to certain embodiments of the disclosure.

FIG. 8 is a simplified flow diagram, illustrating a process for generating a transaction and interacting with the blockchain fabric according to certain embodiments of the disclosure. Blockchain fabric 100 of FIG. 1 is an example of such a blockchain fabric. In certain embodiments, the WAP management entity 102 of FIG. 1 performs several steps of the described process 800. The process 800 is performed by processing logic that comprises hardware (circuitry, dedicated logic, etc.), software (such as is run on a general purpose computer system or a dedicated machine), firmware (embedded software), or any combination thereof. In one embodiment, the process 800 is performed by one or more computer systems 900 as described in FIG. 9. In certain embodiments, the computer system may also be referred to as a server or computing server.

At block 802, components of the computer system, such as a network interface, may receive a request for a password for a WAP. The computer system may be similar to node 500 of a blockchain fabric 100. The request may include a unique identifier (e.g., SSID) for the WAP and a cellular telephone network number associated with a device of a sender of the request. In certain embodiments, the unique identifier for the WAP and the password for the WAP are provided by equipment of an owner of the WAP to a WAP management entity that encrypts and then deletes the password and stores the encrypted password in the transaction along with the unique identifier.

At block 804, components of the computer system, such as the processor, may determine whether the request satisfies a set of conditions to access the password for the WAP from a transaction. The set of conditions may include checking the cellular telephone network number associated with the device. However, the set of conditions may also include membership to a group, such as a social media group, location or payment for accessing the WAP. In certain embodiments, the password for the access to the WAP expires after a pre-determined period of time that is based on the payment.

The transaction may include information associated with a unique identifier for a WAP, a password to access the WAP and a set of conditions to access the password for the WAP. In certain embodiments, the transaction may be stored as part of at least a portion of a blockchain for managing passwords for WAPs, wherein the blockchain comprises a plurality of blocks, each block of the plurality of blocks comprises a plurality of transactions.

The transaction may include information associated with a unique identifier for a WAP, a password to access the WAP and a set of conditions to access the password for the WAP. In certain embodiments, the transaction may be stored as part of at least a portion of a blockchain for managing passwords for WAPs, wherein the blockchain comprises a plurality of blocks, each block of the plurality of blocks comprises a plurality of transactions.

At block 806, components of the computer system, in response to determining that the request satisfies the set of conditions to access the password for the WAP, encrypt the password to generate an encrypted password.

At block 808, components of the computer system send the encrypted password to an equipment associated with a sender of the request. In certain embodiments, the device decrypts the password and accesses the WAP.

In certain embodiments, the password expires after a pre-determined period of time for either a specific requester or for all requesters. In certain embodiments, the request from the sender and the response to the sender of the request are stored in a transaction on the blockchain.

It should be appreciated that the specific steps illustrated in FIG. 8 provide a particular process of switching between modes of operation, according to an embodiment of the present disclosure. Other sequences of steps may also be performed accordingly in alternative embodiments. For example, alternative embodiments of the present disclosure may perform the steps outlined above in a different order. To illustrate, a user may choose to change from the third mode of operation to the first mode of operation, the fourth mode to the second mode, or any combination therebetween. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process 800.

A computer system as illustrated in FIG. 9 may be incorporated as part of the previously described entities shown in FIGS. 1-8. For example, computer system 900 can represent some of the components of the WAP owner/manager device 200, WAP management entity 300, requester user device 400 and the node 500. In addition, the computer system of FIG. 9 may also disclose mobile devices and/or the computer systems discussed in this application. FIG. 9 provides a schematic illustration of one embodiment of a computer system 900 that can perform the methods provided by various other embodiments, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 may also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 may also include a transceiver 950 for transmitting and receiving messages. The transceiver 950 may comprise components, such as a transmitter and a receiver which are combined and share common circuitry or a single housing or may be separate. The transceiver 950 may be modified to communicate with one or more network configurations, such as GSM, a CDMA, a WCDMA, a CMDA2000 1×RTT, or a LTE network.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computer systems such as network input/output devices may be employed.

As mentioned above, in one aspect, some embodiments may employ a computer system (such as the computer system 900) to perform methods in accordance with various embodiments. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. Computer readable storage medium does not refer to transitory propagating signals. In an embodiment implemented using the computer system 900, various computer-readable media might be involved in providing instructions/code to processor(s) 910 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the embodiments described herein. Also, a number of steps may be undertaken before, during, or after the above elements are considered. Accordingly, the above description does not bound the scope of the claims.

What is claimed is:

1. A system, comprising:
a processor; and
a memory that stores executable instructions that, when executed by the processor, facilitate performance of operations, comprising:
storing a first transaction that comprises information associated with a unique identifier for an access point to network services, a password to access the access point, and a condition to be satisfied to access the password for the access point, wherein the first transaction is stored as part of at least a first portion of a blockchain for management of passwords for access points, and wherein the blockchain comprises blocks, each block of the blocks comprises respective transactions;
receiving a request for the password for the access point, the request comprising the unique identifier for the access point and a cellular telephone network number associated with a device from which the request was received;
determining whether the request satisfies the condition to access the password for the access point from the first transaction, wherein determining whether the request satisfies the condition comprises analyzing the cellular telephone network number associated with the device;
in response to determining that the request satisfies the condition to access the password for the access point, encrypting the password to generate an encrypted password;
sending a response to the request comprising the encrypted password to the device from which the request was received; and
storing the request and the response to the request in a second transaction in at least a second portion of the blockchain.

2. The system of claim 1, wherein the unique identifier for the access point and the password for the wireless access point are received from a user equipment authorized to access the access point, and wherein a access point management entity encrypts the password resulting in the encrypted password, deletes the password, and stores the encrypted password in the first transaction along with the unique identifier.

3. The system of claim 1, wherein the password expires after a defined period of time.

4. The system of claim 1, wherein determining whether the request satisfies the condition comprises determining whether the an identity associated with the device from which the request was received belongs to a group based on a digital certificate received from the device.

5. The system of claim 1, wherein determining whether the request satisfies the condition comprises analyzing a smart contract implemented in Ethereum.

6. The system of claim 1, wherein determining whether the request satisfies the condition comprises requiring a payment for accessing the access point, and wherein the password for the access to the access point expires after a defined period of time that is defined based on a time of the payment.

7. The system of claim 1, wherein the condition is based on whether the cellular telephone network number of one or more allowed user of allowed users that are allowed to access the wireless access point.

8. A method, comprising:
receiving, by a system comprising a processor, a request for a password for an access point, wherein the request comprises a unique identifier for the access point and a cellular telephone network number associated with a device associated with a sender identity corresponding to a sender of the request;
determining, by the system, whether the request satisfies a condition to access the password for the access point from a first transaction, wherein:
the condition being satisfied comprises validating the cellular telephone network number associated with the device,
the first transaction comprises information associated with a unique identifier for the access point, the password to access the access point and the condition to access the password for the access point, and
the first transaction is stored as part of at least a portion of a blockchain for managing passwords for access points, wherein the blockchain comprises a group of blocks, each block of the group of blocks comprises a plurality of transactions;
in response to determining that the request satisfies the condition to access the password for the access point, encrypting, by the system, the password to generate an encrypted password;
sending, by the system, a response to the request comprising the encrypted password to the device associated with the sender identity; and
storing, by the system, the request and the response to the request in a second transaction in the blockchain.

9. The method of claim 8, wherein the unique identifier for the access point and the password for the access point are received from a user equipment associated with an authorized user identity authorized to access the access point, and wherein an access point management entity of the access point performs the encrypting, then deletes the password, and stores the encrypted password in the first transaction along with the unique identifier.

10. The method of claim 8, wherein the password expires after a pre-determined period of time.

11. The method of claim 8, wherein the condition being satisfied comprises information for determining whether the sender of the request belongs to a particular group based on a digital certificate provided by the sender of the request.

12. The method of claim 8, wherein the condition being satisfied comprises validation of a smart contract formed using Ethereum.

13. The method of claim 8, wherein the condition being satisfied comprises receiving a payment for accessing the access point, and wherein the password for the access to the access point expires after a pre-determined period of time from the payment.

14. A non-transitory machine-readable medium, comprising executable instructions that, when executed by a processor of a system, facilitate performance of operations, comprising:
storing a first transaction that comprises information associated with a unique identifier for a wireless access point, a password to access the wireless access point, and a group of conditions to access the password for the wireless access point, wherein the first transaction is stored as part of at least a portion of a blockchain for management of passwords for wireless access points, wherein the blockchain comprises a group of blocks, each block of the group of blocks comprises a respective group of transactions;

receiving a request for the password for the wireless access point, the request comprising the unique identifier for the wireless access point and a cellular telephone network number associated with a device from which the request was received;

determining whether the request satisfies the group of conditions to access the password for the wireless access point from the first transaction, wherein the group of conditions comprises a condition that checks the cellular telephone network number associated with the device;

in response to determining that the request satisfies the group of conditions to access the password for the wireless access point, encrypting the password to generate an encrypted password;

sending the encrypted password to the device; and storing the request and a response to the request in a second transaction in the blockchain.

15. The non-transitory machine-readable medium of claim 14, wherein the unique identifier for the wireless access point and the password for the wireless access point are received from equipment of an authorized user of the wireless access point and relayed to a wireless access point management entity that encrypts, then deletes the password, and stores the encrypted password in the first transaction along with the unique identifier.

16. The non-transitory machine-readable medium of claim 14, wherein validity of the password expires after a specified period of time.

17. The non-transitory machine-readable medium of claim 14, wherein the group of conditions comprises a condition based on a check of whether an identity associated with the device belongs to a specified group based on a digital certificate received from the device.

18. The non-transitory machine-readable medium of claim 14, wherein the group of conditions comprises a condition based on a check of a smart contract implemented in Ethereum.

19. The non-transitory machine-readable medium of claim 14, wherein the group of conditions comprises a condition based on whether a payment has been received applicable to accessing the wireless access point, and wherein the password for the access to the wireless access point expires as a function of an amount of the payment.

20. The non-transitory machine-readable medium of claim 14, wherein the group of conditions comprises a condition based on whether the cellular telephone network number corresponds to an allowed user of allowed users that are allowed to access the wireless access point.

* * * * *